Figure 1:
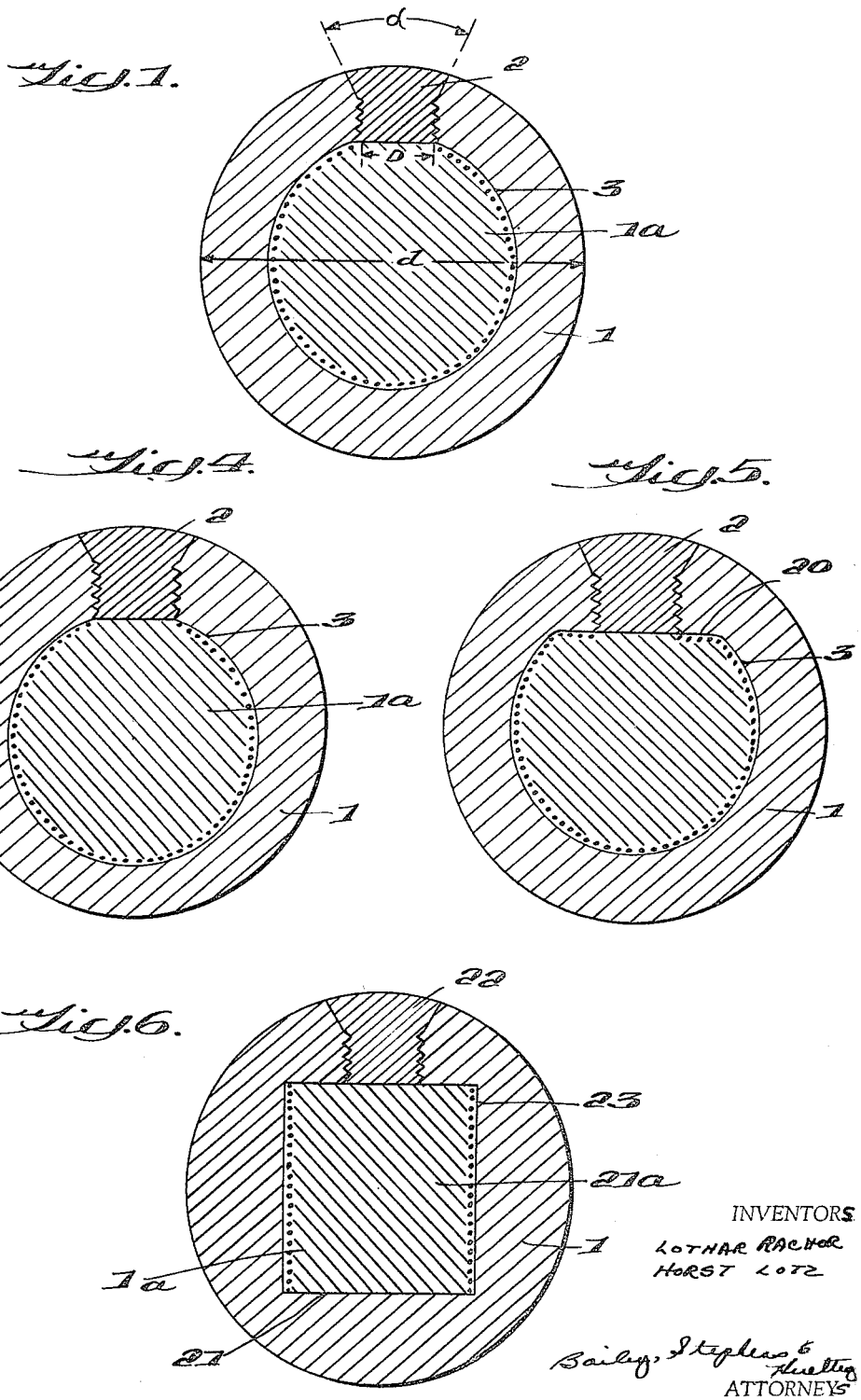

INVENTORS
LOTHAR RACHOR
HORST LOTZ

BY Bailey, Stephens &
Huettig

ATTORNEYS

United States Patent Office 3,284,314
Patented Nov. 8, 1966

3,284,314
FUEL MATERIAL FOR NUCLEAR REACTORS AND PROCESS AND APPARATUS FOR ITS MANUFACTURE
Lothar Rachor, Kleinauheim (Main), and Horst Lotz, Niederrodenbach, Germany, assignors to Nukem Nuklear-Chemie und- Metallurgie Gesellschaft m.b.H., Wolfgang, near Hanau, Germany
Filed Sept. 4, 1964, Ser. No. 394,404
Claims priority, application Germany, Sept. 5, 1963, N 23,700, N 23,701
13 Claims. (Cl. 176—71)

The invention relates to a fuel material for nuclear reactors, and to a process and apparatus for its manufacture.

It it known to use for high temperature power reactors spherical fuel elements with a graphite base, which contain the nuclear fuel, and advantageously also breeder material, in the form of carbides. In one type of such fuel elements the nuclear fuel is used in the form of so-called coated particles. For the production of spherical fuel elements it is known to mix such coated particles with a mass consisting essentially of carbon and a suitable binding medium and to press this mass into a ball. Through subsequent heating of such spheres, the binding material is coked and the sphere is thereby made suitable for emission of power in a reactor at high temperatures. A disadvantage of this concept is the fact that, during the pressure treatment, the sensitive layer on the fuel particles can be disturbed so that the valuable characteristics of the coated particles are decreased. If during the pressing of the fuel element spheres only small pressures are used, in order to preserve the layer on the particles, then only spheres of low density with less stability and poor thermal conductivity are obtained.

Another concept uses spheres of compact electrographite, in which a cylindrical bore is formed. The fuel material composed of a mixture of uranium carbide with an excess of graphite is inserted in the cylindrical cartridge. The advantages of such an arrangement namely, the good thermal conductivity and satisfactory mechanical strength are however offset by the resulting disadvantage that a fuel material cartridge of this type gives off volatile fission products to a greater extent in the reactor, which can easily diffuse through the graphite shell. In order to avoid this, it has been proposed through special impregnating processes to make the electro-graphite less porous for gases. However, this process not only presents technical difficulties, but also involves extraordinary expense.

The primary object of the invention is to provide a fuel element which has the advantages of both the foregoing types, without the disadvantages which have been mentioned. The spherical fuel elements of the invention consist of a body of electro-graphite of good heat conductivity and mechanical strength which may be closed by plugs, which can be screwed in. A hollow is formed in the shell, which is preferably spherical or nearly spherical. The nuclear fuel material of the mixture of nuclear and breeder material is positioned in the hollow in a relatively thin layer on its wall.

The ratio of the inner and outer diameters of the hollow sphere is preferably between 0.4:1 and 0.8:1. It is determined by the need to make the surface area of the hollow for the reception of the fuel materials as large as possible for better heat removal, while insuring that the shell of compact graphite will be thick enough to have a satisfactory mechanical strength and to allow a trouble-free closure with a graphite stopper. In the line of these requirements, which are determined by the heat conductivity and strength necessary for the reactor in question, a more or less thick-walled shell is necessary.

Further objects and advantages of the invention will appear more fully from the following description, particularly when taken in conjunction with the accompanying drawings which form a part thereof.

Figure 2:
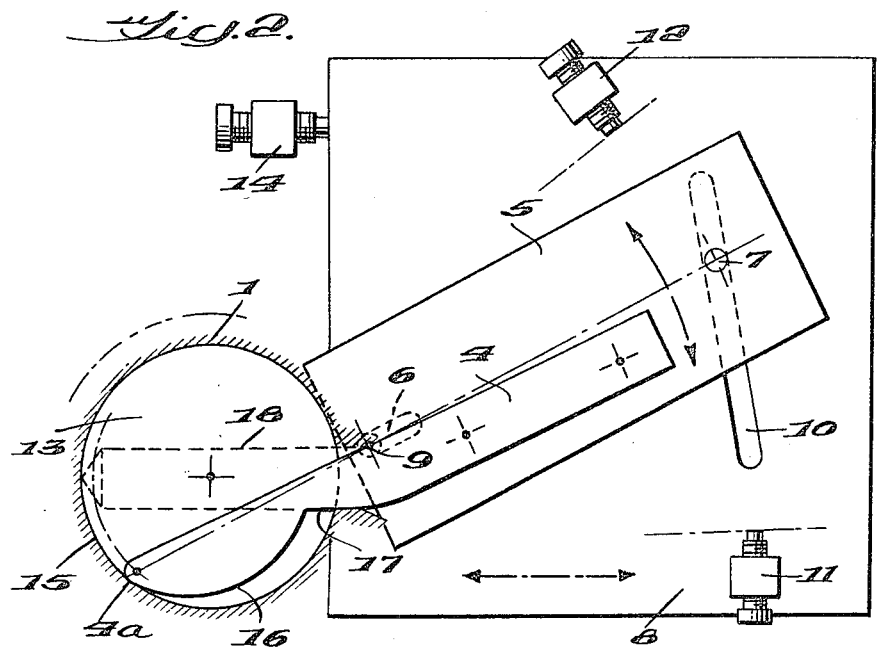
Figure 3:
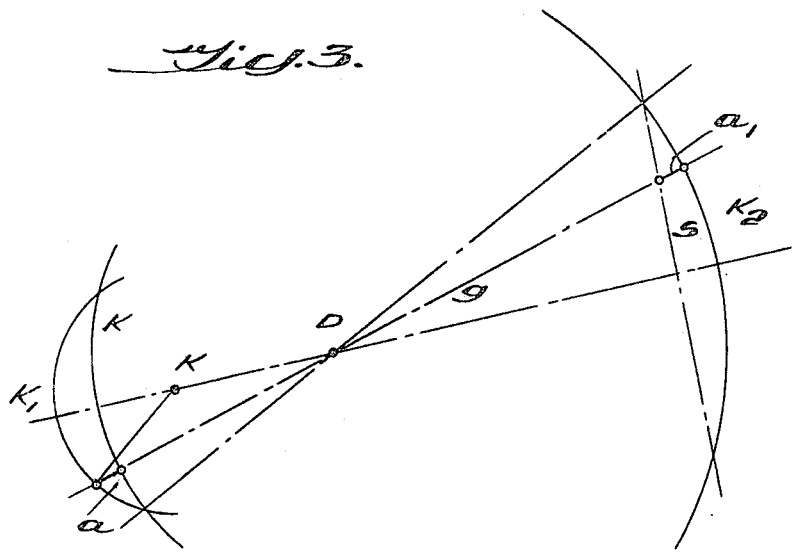

In the drawings:
FIG. 1 shows in cross section a sphere embodying the invention;
FIG. 2 shows an apparatus for use in making such shells;
FIG. 3 shows the geometric basis of the construction;
FIGS. 4 to 6 are cross-sections through modifications of the fuel elements.

According to the invention, the shell 1 of graphite has a central hollow, on the inner wall of which is formed a layer 3 of not very great thickness, in which the fuel material is in the form of finely to grossly dispersed particles, advantageously in the form of coated particles, and preferably mixed with graphite. The fuel material is, as shown, coated in concentric form in admixture with a suitable binding meeting on the inside wall of the shell, for example by a slip process. As a binding medium may be used a dissolved synthetic resin which by subsequent heating, after driving off the solvent, is polymerized and then converted to coke by cracking. Besides dissolved binders it is also possible to use liquid binders, such; as furfuryl alcohol, which can be directly polymerized and cracked. Because the coked binder is a relatively poor heat conductor, it is advantageous to add a graphite powder as a filler, so that the particle containing layer in the finished fuel element consists of fuel particles, graphite grains and coked binders, the particles forming from 5% to 50% of the volume of the layer.

The resultant hollow space is finally filled with a neutron-physically favorable, high-temperature-resistant mass 1a, such as graphite power. Lastly a plug 2 is screwed in, which is advantageously cemented in place, and through glowing of the sphere at 1000° C. to 2000° C. the binder contained in the inner layer as well as the cement on the plug are coked.

The advantage of the concentration of fuel material in a thin layer lies in the improved heat removal in consequence of the short path of the heat waves to the surface of the fuel element shell. The determination of the transport of heat for different layer thicknesses (for equal content of fuel) shows that the temperature rise in the layer from the outer wall of the hollow sphere to the inside of its walls is proportional to the wall thickness. By concentration of the particles in a very thin layer, there is only a very slight temperature rise. It is advantageous to have a lower temperature gradient because the diffusion of fission products through the shell wall is quite dependent on temperature.

A special advantage of the invention over the previously discussed arrangements lies in the fact that the particles during the formation of the layer will be completely undamaged and that also the after-filling of the hollow with a graphite mass can be carried out at low pressures, such as 30 to 100 kg./cm.², so that the particles during the formation of the fuel element are not damaged. The after-filling, because of its elastic nature, holds the fuel material layer in firm contact with the inside of the shell wall.

The outer diameter of a sphere is, for example, 60 mm. and the daimeter of the hollow is 36 mm., whereas the coated particles have a diameter of about 0.4 to 0.7 mm. and are covered with a coating about 0.1 mm. thick of a material impervious to gases.

For such spherical high temperature fuel elements to be used, they must have a good resistance to damage. The balls must for example sustain drops of 4 meters height in a ball testing device onto a ball sheet without breaking.

The resistance to breakage can be favorably influenced if the cross-section of the filling opening in which the plug 2 is secured is substantially smaller than a cross-section of the hollow. Tests have shown that for a spherical fuel element of diameter $d$ such as 60 mm., other things being equal, and a hollow with an internal diameter of $0.6d$ such as 36 mm., a decrease of the diameter of the opening from $0.37d$ to $0.2d$ or 12 mm., increases the minimum tolerated number of drops by a factor of 4. Further decrease of the opening diameter to $0.15d$ improves the stability of the spheres substantially further. This sharp dependance on the size of the filling opening has also been proven by pressure tests and by theroretical calculation of the division of the stress when the sphere is loaded.

Preferably the ratio of the diameter of the filling opening to that of the hollow lies between 0.5:1 and 0.2:1.

The head of the plug which closes the filling opening is advantageously of conical shape, the length of the conical part being desirable from 30% to 50% of the length of the plug. The conical plug head transfers external forces exerted on the plug to the wall of the shell without putting any loads on the threads. A conical angle $\alpha$ between 30° and 60° has proven satisfactory. Too sharp a cone damages the sphere through a wedge effect, while too flat a cone is likely to suffer through breaking off of the edge.

The thread construction along with a suitable bonding makes it certain that the plug is held in its position over all conditions. The depth of the threads is advantageously 1/10 to 1/15 of the outer thread diameter.

In order to assure a secure seating of the plug without damage to the threads, it is advantageous to screw in the plug with a definite turning moment. The degree of turning moment is dependent on the thread diameter.

In order to prevent loosening of the threads during dropping, a cement is provided. This cement after the ensuring coking (heating to 1000° C. to 1800° C.) gives a firm connection between the threads of the plug and the opening, which is not damaged when subjected to impact. A good coking cement with high endurance and low brittleness can be formed of phenolic resins, epoxy resins, furfuryl alcohol or its derivatives or other furone derivatives, either singly or in combination.

FIG. 2 shows an arrangement which is well adapted to produce on a turning machine fuel elements according to the invention, particularly for the formation in the sphere of a hollow.

The arrangement includes a chisel with a rounded point 4a by which a part of the inner contour of the hollow is formed through movement of the point in a circular arc the radius of which corresponds with that of the hollow, while the remainder of the end portion of the work tool is constituted by a circularly profiled cutting edge. The working movement of the chisel generally consists of a movement around a point in the area of the filling opening of the ball, which can be quite small, the tool still being of sufficient rigidity.

Referring again to FIG. 2, a chisel 4 is fastened on and spaced above a carrier part 5. This carries a guiding groove 6 and a bolt 7. It is carried by a base 8 with a guiding bolt 9 and a guiding groove 10.

The carrier part is turnable about the bolt 9 engaged in guide 6, while bolt 7 slides in the groove 10. The carrier 5 is suitably secured to the base plate 8.

The chisel includes a further edge 17 at an angle to its longitudinal axes.

The swinging of the carrier 5 is limited by stops 11 and 12.

In operation, a cylindrical bore is first formed in the shell 1 as indicated by dotted lines at 18. With the bolt 7 in the bottom of the slot 10, the carrier 8 is moved forwards (to the left in FIG. 2) until it engages stop 14, so that the chisel enters the bore 13. The ball 1 is then rotated by a suitable mechanism around the axis of the bore 18, and carrier 5 is gradually shifted counter-clockwise.

During a part of the movement, the tip of the chisel swings in the circular arc 15 and thereafter the chisel is withdrawn longitudinally so that the edge 16 forms the remainder of the spherical interior. The edge 17 follows the contour of the filling opening.

FIGURE 3 shows the geometrical basis of this movement. A turning of the straight line $g$ about the point D only would result in the arc $k$. For achieving the arc $k_1$ around the center K of the sphere, a longitudinal displacement of the straight line G by the amount $a$ is necessary. This longitudinal movement is made possible in a very simple way be guiding a suitable point of the straight line $g$ in a straight line S perpendicular to the line DK at a suitable distance from D. The distance $a_1$ on the straight line $g$ between the secant $s$ and the arc $k_2$ corresponds with sufficient exactness to the distance $a$ between the arcs $k$ and $k_1$.

The resistance to falling of such fuel elements can be further improved if the wall of the shell in the area of the plug is thickened.

For example, this can be accomplished by positioning the hollow eccentrically, as shown in FIG. 4, so that, the area of the plug 2, the wall thickness is greater then elsewhere.

The stability is increased for example by more than 100% with a filling opening diameter of 22 mm., a sphere diameter of 60 mm. and an internal diameter of 36 mm. if the center of the hollow is displaced by 1½ mm. from the center of the shell in a direction away from the plug.

Another possibility for solving this problem is the flattening off of a concentric hollow in the area of the stopper as shown at 20 in FIG. 5 so that the wall of the shell is thickened at this point. This construction has the advantage as compared with FIG. 4 that the spherical symmetry is maintained.

Both of these improvements can be used in combination.

It is also possible to make the hollow of the graphite shell in the form of a cylinder, as shown at 21 in FIG. 6, with a filling opening of less diameter then the diameter of the hollow 21 closed by a plug 22. On the wall of the hollow the fuel or breeder material is formed in a layer as at 23. Whereas with a spherical shape the use of chemical procedures is necessary in order to distribute the fuel or breeder material on the wall of the hollow such equal distribution can be obtained in a cylindrical opening in a dry process by the use of centrifugal force. The nuclear material, advantageously in admixture with a filler of good thermal conductivity such as graphite is, introduced into the shell body while it is rotated and the nuclear material is held by centrifugal force on the inner wall of the shell. The remaining part of the space can then be filled as rotation continues with graphite powder 21a, which can if necessary be packed during rotation by a pressure arrangement. The filled ball is closed by plug 22.

This arrangement has the advantage that special binders for the formation of the nuclear material layer are unnecessary thus treatments for the polymerization and cooking of the binder, which can through the resulting destruction of the materials possibly lead to pressure stresses on the particles, are not necessary.

While we have described herein some embodiments of our invention, we wish it to be understood that we do not intend to limit ourselves thereby except within the scope of the claims hereto or hereinafter appended.

We claim:

1. Fuel element for nuclear reactors comprising a substantially spherical one-piece graphite shell having a hollow therein with an inner wall, at least one nuclear material selected from the group consisting of fuel and breeder materials forming a layer on said inner wall of substantially less thickness than the diameter of said hollow, and a neutron-favorable high-temperature-resistant substance filling the hollow within said layer, said shell having a filling opening which at its widest extent is of substantially less cross-section than the cross-section of the hollow.

2. Fuel element as claimed in claim 1 in which said hollow is substantially spherical.

3. Fuel element as claimed in claim 1 in which the wall thickness of the shell is from 2/10 to 6/10 of its radius.

4. Fuel element as claimed in claim 1 in which the nuclear material is in the form of particles with a gas-impervious coating.

5. Fuel element as claimed in claim 1 in which the layer further contains a bonding agent and graphite powder.

6. Fuel element as claimed in claim 1 in which the substance has a density resulting from being compressed to a pressure of 30 to 100 kg./cm.$^2$.

7. Fuel element as claimed in claim 1, in which the ratio of the cross-section of the widest part of the opening to the cross-section of the hollow lies between 0.4:1 and 0.2:1.

8. Fuel element as claimed in claim 1 in which said shell has a filling opening, and a plug with a conical head filling said opening.

9. Fuel element as claimed in claim 8, in which the angle of conicity of the head is between 30° and 60°.

10. Fuel element as claimed in claim 8, in which the plug is adhesively secured in the filling opening.

11. Fuel element as claimed in claim 1 in which said shell has a filling opening, and a plug filling said opening, the wall thickness of the shell being greater in the area adjacent the opening than in other parts.

12. Fuel element as claimed in claim 1 in which said shell has a filling opening, said hollow being spherical with its center displaced from the center of the shell in a direction away from said filling opening.

13. Fuel element as claimed in claim 1 in which said shell has a filling opening, and a plug filling said opening, said hollow being substantially spherical and concentric with the center of the shell, the inner wall being positioned closer to the center in the area adjacent the opening than in other parts.

References Cited by the Examiner
UNITED STATES PATENTS

| | | | |
|---|---|---|---|
| 2,325,437 | 7/1943 | Temple | 83—194 |
| 2,419,534 | 4/1947 | Burleson | 83—194 |
| 2,990,351 | 6/1961 | Sanz et al. | 176—71 |
| 2,991,601 | 7/1961 | Glatter et al. | 53—24 |
| 3,043,761 | 7/1962 | Reynolds | 176—67 |
| 3,079,316 | 2/1963 | Johnson | 176—90 X |
| 3,081,249 | 3/1963 | Whittemore | 264—21 |
| 3,098,809 | 7/1963 | Huet | 176—90 X |
| 3,135,665 | 6/1964 | Koutz et al. | 176—91 X |
| 3,142,626 | 7/1964 | Wellborn | 176—67 |
| 3,158,547 | 11/1964 | Smith | 176—69 |
| 3,166,614 | 1/1965 | Taylor | 176—90 X |

FOREIGN PATENTS

| | | |
|---|---|---|
| 621,315 | 5/1961 | Canada. |
| 1,318,135 | 1/1963 | France. |

BENJAMIN R. PADGETT, *Acting Examiner.*

L. DEWAYNE RUTLEDGE, REUBEN EPSTEIN,
*Examiners.*

J. V. MAY, M. J. SCOLNICK, *Assistant Examiners.*